United States Patent [19]
Stoddard et al.

[11] 4,178,357
[45] * Dec. 11, 1979

[54] STRIPPING SULPHUR COMPOUNDS FROM STACK AND OTHER DISCHARGE GASES AND THE COMMERCIAL PRODUCTS DERIVED THEREFROM

[76] Inventors: Xerxes T. Stoddard, 4617 W. 27th Ave., Denver, Colo. 80212; Vesper A. Vaseen, 9840 W. 35th Ave., Wheatridge, Colo. 80033; Ruel C. Terry, 3090 S. High St., Denver, Colo. 80210

[*] Notice: The portion of the term of this patent subsequent to Mar. 6, 1996, has been disclaimed.

[21] Appl. No.: 855,244

[22] Filed: Nov. 28, 1977

[51] Int. Cl.² .................................... C01B 17/72
[52] U.S. Cl. ............................... 423/522; 423/529
[58] Field of Search ............... 55/73; 423/242, 522, 423/531–543, 512 A, 521

[56] References Cited

U.S. PATENT DOCUMENTS

| | | | |
|---|---|---|---|
| 3,350,075 | 10/1967 | Douglas | 55/73 |
| 3,762,133 | 10/1973 | Merriman et al. | 55/73 |
| 3,831,348 | 8/1974 | Pap | 55/73 |
| 3,849,541 | 11/1974 | Bertrand | 55/73 |
| 3,860,402 | 1/1975 | Strom et al. | 55/73 |
| 3,938,738 | 2/1976 | Nagel et al. | 261/DIG. 75 |
| 3,963,611 | 6/1976 | Dardenne-Awkringa, Jr. | 423/544 |
| 4,049,398 | 9/1977 | Vaseen | 55/36 |

FOREIGN PATENT DOCUMENTS

| | | | |
|---|---|---|---|
| 600803 | 6/1960 | Canada | 423/221 |
| 958322 | 11/1974 | Canada | 261/DIG. 75 |

Primary Examiner—O. R. Vertiz
Assistant Examiner—Gary P. Straub
Attorney, Agent, or Firm—Ruel C. Terry

[57] ABSTRACT

Stack gases derived from combustion of hydrocarbons are scrubbed by direct contact with an inert liquid capable of taking sulphur compounds into solution. The inert liquid pregnant with sulphur compounds is injected into a reactor where the sulphur compounds are converted into sulphurous acid or in the presence of a catalyst wet oxidized into sulphuric acid. Product acid is withdrawn from the reactor and the stripped inert liquid is returned to the scrubber to repeat the process. Waste heat is captured for further useful work.

5 Claims, 1 Drawing Figure

U.S. Patent
Dec. 11, 1979
4,178,357
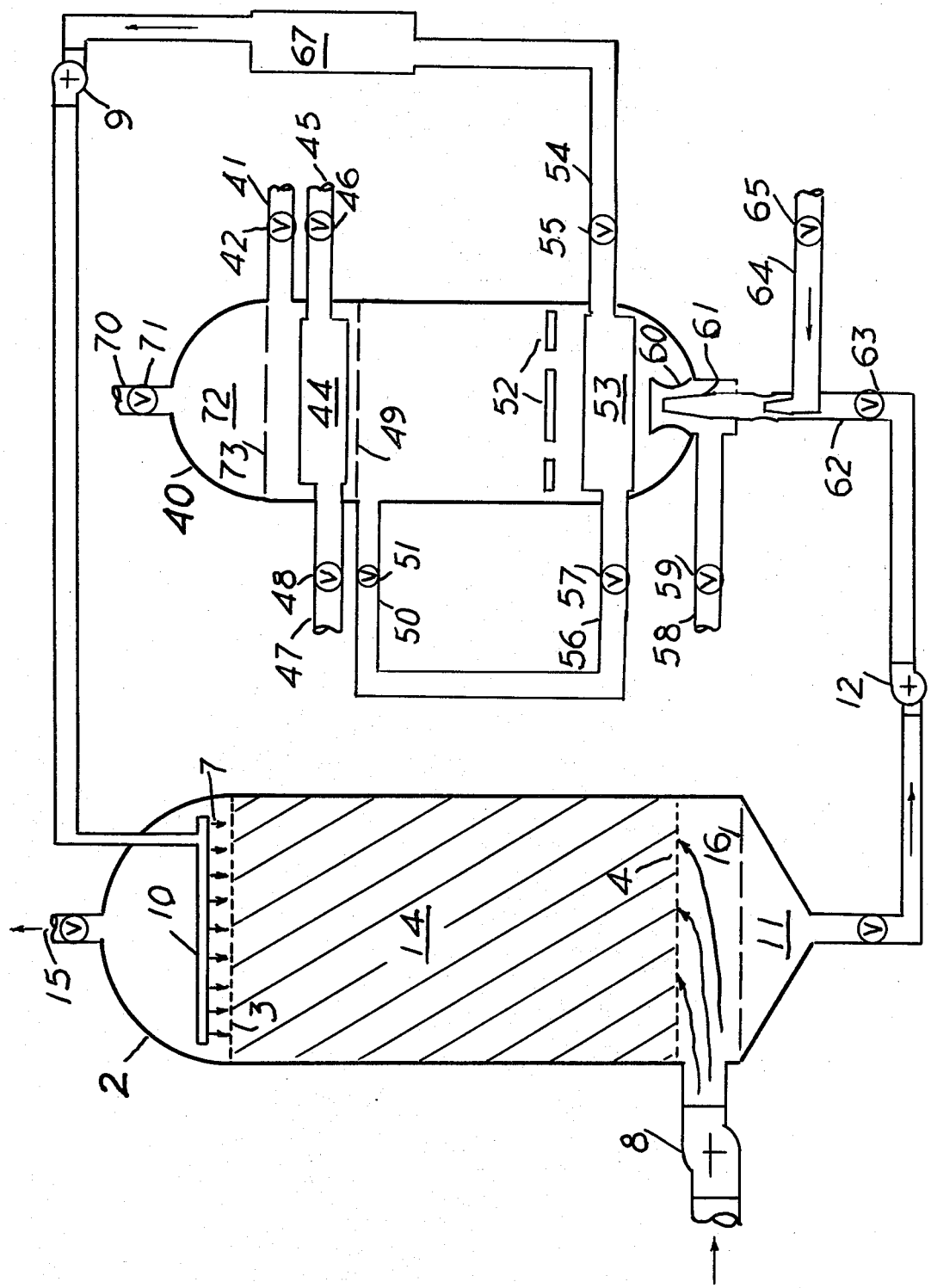

STRIPPING SULPHUR COMPOUNDS FROM STACK AND OTHER DISCHARGE GASES AND THE COMMERCIAL PRODUCTS DERIVED THEREFROM

BACKGROUND OF THE INVENTION

This invention relates to the removal of sulphur compounds from stack and other vent gases, then wet oxidizing the sulphur compounds into product acids.

In recent times considerable public interest has been focused on pollution of the atmosphere as a result of burning fuels. In the industrial sector particular attention has been directed to the emissions from smoke stacks, which in the United States has resulted in federal requirements limiting certain contaminants. From an industrial point of view perhaps the most troublesome limitation is a maximum allowance of 1.2 lb. of $SO_2$ to be emitted in the stack gas for each million BTUs fired. Such limitation in effect establishes the maximum sulphur content of the fuel to be burned unless sulphur removal methods are employed.

Among the fuels, coal particularly is affected because much of the coal available contains too much sulphur to meet the standards. One solution is to use low sulphur coal. Another is to blend low sulphur coal with high sulphur coal in such proportions as to remain within standards. Another solution is to remove the sulphur from the coal before burning, a process at the present state of the art that is generally too costly for serious consideration.

Still another solution, which is gaining favor in recent times, is to remove sulphur compounds from the stack gas (sometimes called flue gas). Removing sulphur compounds generally falls into two categories: residue disposal systems and regenerable systems. Among the better of the residue disposal systems are those that use a slurry of limestone or lime to absorb $SO_2$, resulting in an end-product sludge that, unfortunately, has no commercial value. Among the regenerable systems one of the better processes absorbs $SO_2$ in a solution of sodium sulphite which then is converted into bisulphite. After several other processing steps, $SO_2$ is segregated in concentrated form for further conversion downstream into elemental sulphur or sulphuric acid. In the coarse of the process sodium sulphite is regenerated and recycled. With the trend toward regenerable processes of sulphur removal, in spite of the fact that the best of the systems use about 3% of the output from an electric generating plant, it appears obvious that a significant improvement is needed to reduce the operating costs attributable to the scrubber system. The present invention is designed to simplify the steps and reduce the energy required for scrubber system operation.

Other vent gases or atmospheric discharges that can be treated with the methods of the present invention are sour gas wells, refineries, and manufacturing process plants using sulphur bearing compounds in their processes.

It is an object of the present invention to teach methods of sulphur removal from stack gases wherein an inert scrubber liquid is used to absorb the sulphur compounds. It is another object of the present invention to teach the removal of the sulphur compounds from the inert scrubber liquid by wet oxidation of the sulphur compounds into product acid. Other objects, capabilities and advantages of the present invention will become apparent as the description proceeds and upon reference to the drawing.

BRIEF DESCRIPTION OF THE DRAWING

The FIGURE is a diagrammatic sketch showing the arrangement of apparatus for the methods of the invention.

SUMMARY OF THE INVENTION

Sulphur compounds are removed from stack gas by directing the stack gas into a packaged bed scrubber tower. Within the scrubber tower the stack gas percolates upward where it is met by an inert liquid cascading downward. The inert liquid has an affinity for $SO_2$ and takes the $SO_2$ into solution. Stack gas proceeds out the top of the scrubber tower and into the stack where the gases are dispersed to the atmosphere. The inert liquid, pregnant with $SO_2$, is removed from the bottom of the scrubber tower and is then injected under pressure into a reactor tower; within the reactor tower the $SO_2$ is stripped from the inert liquid by reaction with water into sulphurous acid, or in the presence of a catalyst, into sulfuric acid. The product acid, being of a lower specific gravity than the inert liquid, floats atop the column of inert liquid and is continuously withdrawn into product storage. Supplemental oxygen is injected into the reactor tower, as required, to support the wet oxidation reaction. The stripped inert liquid is continuously withdrawn from the reactor tower and reinjected into the scrubber tower to repeat the process. A portion of the heat generated during wet oxidation is captured and used for further useful work.

Sulphurous acid is the combination of sulphur dioxide and water. Sulphur compounds other than sulphur dioxide are converted in the wet oxidizer first to sulphur dioxide; then with the presence of a catalyst to sulphur trioxide. When sulphurous acid is the desired product then the water content of the effluent from the scrubber and/or the wet oxidizer is controlled.

INTRODUCTION

Sulphur dioxide is very soluble in water as illustrated by the following tables from Perry's Chemical Engineering Handbook, Fourth Edition, p 14—6-14—7.

Table 14-31[3]

| Weight of $SO_2$ per 100 Weight of $H_2O$ | Sulfur Dioxide ($SO_2$) | | | | | | | |
|---|---|---|---|---|---|---|---|---|
| | Partial pressure $SO_2$, mm. Hg | | | | | | | |
| | 0° C. | 7° C. | 10° C. | 15° C. | 20° C. | 30° C. | 40° C. | 50° C. |
| 20 | 646 | 657 | | | | | | |
| 15 | 474 | 637 | 726 | | | | | |
| 10 | 308 | 417 | 474 | 567 | 698 | | | |
| 7.5 | 228 | 307 | 349 | 419 | 517 | 688 | | |
| 5.0 | 148 | 198 | 226 | 270 | 336 | 452 | 665 | |
| 2.5 | 69 | 92 | 105 | 127 | 161 | 216 | 322 | 458 |
| 1.5 | 38 | 51 | 59 | 71 | 92 | 125 | 186 | 266 |

Table 14-31³-continued

Sulfur Dioxide (SO₂)

| Weight of SO₂ per 100 Weight of H₂O | Partial pressure SO₂, mm. Hg | | | | | | | |
|---|---|---|---|---|---|---|---|---|
| | 0° C. | 7° C. | 10° C. | 15° C. | 20° C. | 30° C. | 40° C. | 50° C. |
| 1.0 | 23.3 | 31 | 37 | 44 | 59 | 79 | 121 | 172 |
| 0.7 | 15.2 | 20.6 | 23.6 | 28.0 | 39.0 | 52 | 87 | 116 |
| .5 | 9.9 | 13.5 | 15.6 | 19.3 | 26.0 | 36 | 57 | 82.0 |
| .3 | 5.1 | 6.9 | 7.9 | 10.0 | 14.1 | 19.7 | | |
| .2 | 2.8 | 3.7 | 4.6 | 5.7 | 8.5 | 11.8 | .... | 31.0 |
| .15 | 1.9 | 2.6 | 3.1 | 3.8 | 5.8 | 8.1 | 12.9 | 20.0 |
| .10 | 1.2 | 1.5 | 1.75 | 2.2 | 3.2 | 4.7 | 7.5 | 12.0 |
| .05 | 0.6 | 0.7 | 0.75 | 0.8 | 1.2 | 1.7 | 2.8 | 4.7 |
| .02 | .25 | .3 | .3 | .3 | 0.5 | 0.6 | 0.8 | 1.3 |

Table 14-32

Sulfur Dioxide (SO₂)

| Weight of SO₂ per 100 weights of H₂O | 0° C. | 10° C. | 20° C. | 25° C. | 30° C. | 40° C. | 50° C. |
|---|---|---|---|---|---|---|---|
| 15 | 500 | 735 | | | | | |
| 10 | 310 | 470 | .... | 840 | | | |
| 8 | 240 | 370 | 580 | 670 | 780 | | |
| 6 | 175 | 270 | 430 | 505 | 580 | 770 | |
| 4 | 110 | 170 | 270 | 320 | 380 | 510 | 700 |
| 2 | 50 | 75 | 110 | 150 | 170 | 250 | 340 |
| 1 | 20 | 35 | 30 | 60 | 70 | 110 | 160 |

Seidell and Linke, "Solubilities of Oronganic and Organic Compounds p.519, Van Nostrand, Princeton, N.J., 1952.

Table 14-33

Sulfur Dioxide (SO₂)

| Weight of SO₂ per 100 weights of H₂O | 30° C. | 50° C. | 70° C. | 90° C. | 100° C. |
|---|---|---|---|---|---|
| 7.45 | 750 | 1243 | | | |
| 4.36 | 420 | 778 | 1272 | | |
| 1.04 | 82.5 | 149 | 301 | 465 | |
| 0.51 | .... | 76.0 | 146 | 239 | 358 |

See Pearson, Lundberg, West, and McCarthey (Chem. Eng. Progress, 47,257 (1951) for a review of all available solubility data for SO₂ in H₂O Sulphurous Acid is formed by $$SO_2 + H_2O = H_2SO_3$$

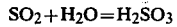

Control of the strength of sulphurous acid produced is a matter of process temperature and pressure along with water quantity available.

The effectiveness or efficiency of absorption of sulphur dioxide into the absorber liquid, is a mass transfer process, which depends upon the solubility of the gas and kinetic impact of the molecules at the liquid interface. The maximum absorption occurs when there is a maximum contact between the gas and the scrubbing solvent.

Various shapes of low cost, inert materials have been developed for use in scrubber towers providing large surface areas, low resistance to gas flow and high absorption capacity.

Packing materials preferably are carbon, porcelain and plastic. For the corrosive gases of sulphur compounds all of these are satisfactory.

Those familar with the art & science of scrubbing are aware of the design for use of these materials; or as to such references as Perry, J. H.; Chemical Engineers Handbook; 4th Ed.; McGraw-Hill, N.Y., 1963 pp 18-28.

Stack gases contain other gases besides the sulphur bearing compounds, which for the most part are carbon dioxide and nitrogen. These gases will also be absorbed by the inert scrubber liquid, until they saturate the carrier liquid for each specie, then the excess gases will pass on through the scrubber to discharge.

The carbon dioxide and nitrogen gas which is sent forward to the wet oxidizer, are released from the scrubber/wet oxidizer liquid due to the reduced solubility at the operating temperatures/pressure within the reactor. The gases rise to the crown of the reactor where they are released either to atmosphere or through a heat exchanger (not shown) for heat recovery.

DESCRIPTION OF THE PREFERRED EMBODIMENTS

The stack gas used in the practice of the present invention preferably has been pretreated to remove particulate matter. While the stack gas may contain several sulphur compounds, the prevalent sulphur compound is sulphur dioxide and thus is of primary interest in the practice of the present invention. While the methods of the present invention may be used with any fuel containing sulphur, for illustrative purposes only, the methods are described with regard to coal.

The stack gases used as an example are the products of combustion from the burning with 125% air, an Ohio coal, with the following analysis:

| Carbon | 72.8# |
|---|---|
| Hydrogen | 4.8# |
| Oxygen | 6.2# |
| Nitrogen | 1.5# |
| Sulphur | 2.2# |
| Water | 3.5# |
| Ash | 9.0# |
| Total | 100# |

When a product acid is desired even in preference to cleaning of a vent or stack gas, additional sulphur or sulphur bearing compounds can be added to the raw fuel or to the wet oxidizer to enhance the quantity of acid produced.

When this coal is burned at the rate of 1000 pounds per minute the stack gases produced consist of:

| Gas | Mols | Pounds |
|---|---|---|
| $CO_2$ | 60.7 | 2670.8 |
| $H_2O$ | 34.6 | 622.8 |
| $SO_2$ | 0.7 | 44.8 |
| $N_2$ | 335.6 | 9391.8 |
| $O_2$(escess) | 17.9 | 572.8 |
| Total | | 13,308.0 |

Referring now to the drawing, the removal of the sulphur dioxide is accomplished by commingling the hot stack gases in a scrubber tower 2 which is a tower packed with inert solid material 14 that is in units, for example ceramic balls, which permit the passage of fluids through the tower. The portion of the tower between top of packing 3 and its support 4 is for example 50 feet in height to permit gases at an upflow velocity of for example five feet per second to remain in contact with the downflowing inert absorbent liquid 7 for a length of time required for the absorbent liquid to absorb the sulphur dioxide. The gas pressure within the tower should be maintained within an acceptable operating range, for example 0.10 psia to 147 psia. Preferably the inert absorbent liquid is a trifluorocarbon amine $(C_{(8+x)}F_{(17+y)})_3N$ having a usable temperature of up to about 480° F. (249° C.) which not only provides an excellent sulphur dioxide gas absorbent liquid, but also provides a liquid which can be used to wet oxidize the dissolved sulphur dioxide into product acid.

Stack gases to the scrubber tower are passed upward through the tower at a rate of for example 21,900 acfm. In some cases a pressure increase may be necessary, which can be accomplished by blower or pump 8.

The inert absorber liquid is sprayed from a manifold 10 over the top 3 of the packed tower bed 14 by a pump 9 to cause an even distribution of absorber liquid as it passes down through the packed tower in counter current flow to the uprising gases.

Inert absorbent liquid pregnant with sulphur dioxide is collected in the bottom 11 of the scrubber tower and removed by a pump 12 so the maximum level of the liquid 16 permits ample space under the packed tower bed 14 to permit even distribution of the gases starting up through the scrubber tower.

The absorber liquid discharged into the scrubber tower 2 is a recycle use of previously used liquid which has been through the wet oxidizer reactor vessel 40 and has been stripped of its sulphur dioxide by, in one case, being wet oxidized to trioxide, reacted with water to form sulphuric acid, its heat removed and its temperature lowered to 70° F. in a cooler 67.

The absorber liquid when sprayed into the scrubber tower 2 at 70° F. will absorb heat as it passes down and commingling with the uprising hot gases and with for example 1,380,000 BTU per minute being introduced to the scrubber tower by the 350° F. influent gases. The absorbent liquid will leave the scrubber tower at approximately 217° F. In operation the temperature in the scrubber tower should be maintained above the freezing temperature of water and should not exceed a temperature wherein the scrubber liquid loses its capability to absorb sulphur compounds, preferably a maximum temperature of 350° F. Water carried in the hot gases is kept in the vapor phase so it can be discharged with the exit gas stream 15.

Wet oxidation of the dissolved sulphur dioxide is accomplished by removing the hot absorbent liquid from the reservoir 11 under the scrubber tower 2 by a pump 12 which has sufficient pressure to introduce it into the wet oxidizer reactor vessel 40.

A provision for adding water sufficient to react with the sulphur trioxide and produce sulphuric acid is provided via flow line 58. Free oxygen can be introduced into reactor vessel 40 via flow line 64.

The reactor 40 of suitable dimensions, for example 21 inches inside diameter and a liquid height of 120 feet, is established. Within the reactor 40 are heat exchanger 44 which removes surplus heat, and heat exchanger 53 which is used to heat the injected fluids. Heat exchanger 44 contains inlet flow line 47 with valve 48 and outlet flow line 45 with valve 46. At the top of the reactor 40 is outlet flow line 41 with valve 42. The product sulphuric acid floats atop the oxygen carrier liquid forming a boundary between the two identified as 49 on the drawing and sometimes called the product-carrier contact. Below boundary 49 there is located an outlet flow line 50 containing valve 51.

The stripped inert liquid bound from the pump 9 may come either from flow line 50 when circulating through heat exchanger 53, from flow line 54.

At various locations within reactor 40 are catalyst trays 52. Heat exchanger 53 contains inlet flow line 56 with valve 57 and outlet flow line 54 with valve 55. Water added is injected into the reactor through flow line 58 containing valve 59 and through venturi 60. The oxygen carrier liquid is injected into the reactor through flow line 62 containing valve 63 and through nozzle 61. The oxygen carrier liquid is supersaturated with oxygen with the oxygen being injected through flow line 64 containing valve 65.

The process of stripping the sulphur dioxide from the inert absorbent liquid, sometimes called the oxygen carrier liquid begins by opening valve 42 then opening valve 63 to permit filling the reactor with oxygen carrier liquid, with all other valves closed. Upon filling the reactor, valve 42 is closed and injection continues through flow line 62 until the reactor pressure near valve 42 reached the planned pressure, for example 588 psia. The reactor can be operated in the pressure range of 30 psia to 3200 psia, but for practical purposes the lower end of the range is preferred. Reactor 40 is suitably insulated (not shown) to minimize heat losses to the ambient environment.

With all valves closed and the contents of reactor 40 at approximately 210° F., reactor start-up is begun by activating heat exchanger 53. Hot fluid, for example at a temperature of 500° F. (260° C.) is circulated through heat exchanger 53 in order to heat the oxygen carrier liquid in the lower portion of the reactor to a temperature near that of planned operating conditions, for example 480° F. (249° C.). Heat exchanger 53 may be of any convenient configuration but preferably of the type that has the capability of transfer of large quantities of heat to ascending liquids within reactor 40. The hot fluid injected initially into heat exchanger 53 may be from any convenient source, for example steam. After the reactions within reactor 40 becomes stabilized in operation, the heat required for heat exchanger 53 can be supplied, for example, by circulating withdrawn stripped inert liquid from flow line 50 into flow line 56, or by circulating, for example, product acid withdrawn from flow line 41.

With preheat initiated in heat exchanger 53, additional start-up steps are accomplished by opening valve 59, 63 and 51, with injection rates through flow line 58 and 62 operating in concert with the withdrawal rate through flow line 50 in order to maintain the desired pressure in reactor 40, for example in the range of 30 to 3200 psia but preferably 588 psia.

Within a relatively short period of time, for example approximately two minutes, reactor 40 will be up to planned operating conditions, for example an average temperature of 480° F. (249° C.) and a pressure of 588 psia. The planned reactions will be underway for wet oxidizing sulphur to sulphur trioxide in the presence of water to form sulphuric acid. With the planned reactions stabilized, valve 42 is opened to the extent necessary to withdraw sulphuric acid at a rate that will maintain the product-stripped carrier liquid at a convenient level for example, at a point 49 above flow line 50. Heat exchanger 44 is then activated to withdrawn some of the exothermic heat by circulating a heat receptive fluid, for example water, into flow line 47 and withdrawing the heat through flow line 45 in fluid form, for example steam. This surplus heat is then captured apart for further useful work, for example generating electricity. A portion of the sensible heat in the product sulphuric acid may also be captured by heat exchange (not shown) for further useful work.

For illustrating purposes the wet oxidizer herein described is used to convert the 44.8 pounds of sulphur dioxide absorbed in scrubber tower 2 each minute.

The oxygen required to convert the sulphur dioxide to sulphur trioxide is 11.20 pounds per minute. The use of a scrubber liquid such as $(C_8F_{17})_3N$ at 6413 GPM, absorbs oxygen in the amount of 37 pounds per minute, and thus provides ample oxygen in solution to satisfy the wet oxidation reaction of sulphur dioxide to sulphur trioxide. Stack gases very highly contaminated with sulphur dioxide or hydrogen sulphide, and especially from stack gases containing little or no oxygen, will not provide sufficient oxygen, thus a means of adding oxygen is provided through flow line 64.

Water is required to provide the strength of sulphuric acid desired as the product acid. A much less corrosive environment is created if fuming (66° Baume) sulphuric acid is produced. The 44.8 pounds of dissolved sulphur dioxide when oxidized to sulphur trioxide require 12.60 pounds per minute of water be added.

If the scrubber tower is operated with an inlet absorber liquid at 70° F. the liquid temperature will rise to approximately 217° F. in the tower and keep water in a vapour phase. Generally it will be necessary to add 12.60 pounds of water per minute to the wet oxidizer vessel 40. The water is added thru flow line 58. It can be added as steam or hot water.

Preferably the oxygen carrier liquid is saturated with oxygen at the scrubber tower 2. If more oxygen is needed, the oxygen carrier liquid can be supersaturated with oxygen by opening valve 65 and adding oxygen at a rate of, for example, 3.72 pounds of oxygen for each 1000 pounds of oxygen carrier liquid. The supersaturated oxygen carrier liquid injected through nozzle 61 is then intimately mixed with water or steam injected thru venturi 60.

In accordance with foregoing description the retention time is designed for one minute, even though the actual chemical reaction time at 480° F. (249° C.) and 588 psia is at practical use, instantaneous. During the one minute time 68.60 pounds of 66° Baume sulphuric acid is manufactured generating an exothermic heat of 6925 BTU/pound of sulphur dioxide or 310,240 BTU per minute.

Other gases absorbed in the inert scrubber liquid, such as nitrogen and carbon dioxide, are released from solution in reactor 40. These gases do not enter into reaction and therefore form a gas cap 72 and a gas-product boundary 73. These gases are removed from reactor 40 via flow line 70 by opening valve 71 in concert with other valves to maintain the gas-product boundary above flow line 41.

The wet oxidizer vessel 40 contains 802 pounds of absorber liquid requiring 74,185 BTU to raise it from 210° F. to 480° F. or operating temperature. The oxidation of the sulphur dioxide to sulphur trioxide plus the heat of solution in water provide 310,240 BTU per a minute. Excess exothermic heat of 236,055 BTU per minute is required to be removed at heat exchanger 44 to control the maximum rise in temperature within the wet oxidizer reactor vessel.

The amount of exothermic heat available for outside work is dependent on the efficiency of insulation of the reactor, attendant flow lines and auxiliary storage vessels together with the efficiency of the various heat exchanges. The current state of the art in insulation and heat exchange will permit the capture of surplus heat for further useful work in the order of 172,000 BTU per minute.

Thus it may be seen that objectionable sulphur compounds may be removed from stack gas and sulphuric acid may be manufactured to compact facilities and within closed circuits by oxidizing sulphur dioxide in a liquid environment. Further the generated heat may be captured apart for other useful work. While the present invention has been described in a certain degree of particularity, it is understood that the present disclosure has been made by way of example and that changes in details of structure may be made without departing from the spirit thereof.

What is claimed is:

1. A method for production of sulphuric acid wherein a fuel combustor is coupled to a wet oxidation reactor, the said fuel combustor being operated with excess air in burning a fuel containing sulphur into flue gas, comprising the steps of
    passing the flue gas through a scrubber in intimate contact with $(C_8F_{17})_3N$, the said $(C_8F_{17})_3N$ having the inherent capability of absorbing sulphur dioxide and oxygen,
    withdrawing the said $(C_8F_{17})_3N$ with absorbed sulphur dioxide and oxygen into the said wet oxidation reactor,
    injecting water into the said wet oxidation reactor, and
    wet oxidizing sulphur dioxide in the presence of water into sulphuric acid.

2. The method of claim 1 wherein the said wet oxidation reactor is maintained in the pressure range of 30 psia to 3200 psia in the temperature range of 210° F. to 480° F.

3. The method of claim 1 further including the step of withdrawing sulphuric acid from the said wet oxidation reactor.

4. The method of claim 1 further including the step of withdrawing heat from the said wet oxidation reactor.

5. The method of claim 1 further including the step of recycling the said $(C_8F_{17})_3N$ from the said wet oxidation reactor to the said scrubber.

* * * * *